(12) United States Patent
Ding (10) Patent No.: US 12,447,434 B2
(45) Date of Patent: Oct. 21, 2025

(54) POROUS SOLID AMINE ADSORBENTS AND APPLICATIONS

(71) Applicant: Decarbontek LLC, Woburn, MA (US)

(72) Inventor: Yong Ding, Waban, MA (US)

(73) Assignee: Decarbontek LLC, Woburn, MA (US)

( * ) Notice: Subject to any disclaimer, the term of this patent is extended or adjusted under 35 U.S.C. 154(b) by 620 days.

(21) Appl. No.: 17/859,139

(22) Filed: Jul. 7, 2022

(65) Prior Publication Data

US 2023/0011904 A1    Jan. 12, 2023

Related U.S. Application Data

(60) Provisional application No. 63/220,734, filed on Jul. 12, 2021, provisional application No. 63/220,744, (Continued)

(51) Int. Cl.
*B01D 53/04* (2006.01)
*B01D 53/02* (2006.01)
(Continued)

(52) U.S. Cl.
CPC ......... *B01D 53/0415* (2013.01); *B01D 53/02* (2013.01); *B01D 53/0438* (2013.01); *B01D 53/0462* (2013.01); *B01D 53/047* (2013.01); *B01J 20/267* (2013.01); *B01J 20/28054* (2013.01); *B01J 20/3071* (2013.01);
(Continued)

(58) Field of Classification Search
CPC .. B01D 53/02; B01D 53/04; B01D 2257/302; B01D 2257/304; B01D 2257/504; B01J 20/267; B01J 20/28054; B01J 20/3071; B01J 20/3078
See application file for complete search history.

(56) References Cited

U.S. PATENT DOCUMENTS

| 5,181,940 A | 1/1993 | Bikson et al. |
| 8,025,718 B2 | 9/2011 | Kooijman |

(Continued)

FOREIGN PATENT DOCUMENTS

| EP | 2 266 680 | 12/2010 |
| EP | 2 266 680 A1 | 12/2010 |
| WO | WO 2013/116408 A1 | 8/2013 |

OTHER PUBLICATIONS

Saki et al., "Fabrication and characterization of silane-functionalized Na-bentonite polysulfone/polyethylenimine nanocomposite membranes for dye removal", Journal of Applied Polymer Science, vol. 137, No. 36, Feb. 2020, 12 pages. (Year: 2020).*

(Continued)

*Primary Examiner* — Robert Clemente
(74) *Attorney, Agent, or Firm* — HoustonHogle LLP (57) ABSTRACT

Porous solid amine adsorbents are prepared by bringing into contact a first (e.g., dope) solution, including a water insoluble polymer and a water-soluble amine polymer, with an aqueous solution containing a multifunctional chemical agent. The first solution can be obtained by dissolving the water insoluble polymer and the water-soluble amine polymer in a polar solvent. The adsorbents can be in the form of beads, sheets, fibers, hollow fibers, etc. and can be used in the removal of acid gases, $CO_2$, for instance, from fluid streams.

26 Claims, 6 Drawing Sheets

Related U.S. Application Data filed on Jul. 12, 2021, provisional application No. 63/220,739, filed on Jul. 12, 2021, provisional application No. 63/220,745, filed on Jul. 12, 2021.

(51) Int. Cl.
*B01D 53/047* (2006.01)
*B01J 20/26* (2006.01)
*B01J 20/28* (2006.01)
*B01J 20/30* (2006.01)

(52) U.S. Cl.
CPC ..... *B01J 20/3078* (2013.01); *B01D 2253/102* (2013.01); *B01D 2253/108* (2013.01); *B01D 2253/202* (2013.01); *B01D 2253/204* (2013.01); *B01D 2253/311* (2013.01); *B01D 2257/302* (2013.01); *B01D 2257/304* (2013.01); *B01D 2257/504* (2013.01); *B01D 2259/40088* (2013.01)

(56) References Cited

U.S. PATENT DOCUMENTS

| | | | |
|---|---|---|---|
| 8,133,308 | B2 | 3/2012 | Lively et al. |
| 8,377,172 | B2 | 2/2013 | Koros et al. |
| 8,597,411 | B2 | 12/2013 | Shahin et al. |
| 8,974,577 | B2 | 3/2015 | Jiang et al. |
| 9,000,533 | B2 | 4/2015 | Wu et al. |
| 9,140,186 | B2 | 9/2015 | Wei et al. |
| 9,146,035 | B2 | 9/2015 | Boulet |
| 9,457,340 | B2 | 10/2016 | Buelow et al. |
| 9,782,718 | B1 | 10/2017 | Baker et al. |
| 9,856,769 | B2 | 1/2018 | Baker et al. |
| 10,118,136 | B2 | 11/2018 | Ungerank et al. |
| 10,525,400 | B2 | 1/2020 | Coignet et al. |
| 10,696,025 | B2 | 6/2020 | Peinemann et al. |
| 2013/0213229 | A1 | 8/2013 | Shahin et al. |
| 2013/0213881 | A1* | 8/2013 | Diallo ............... B01D 71/601 210/500.28 |
| 2023/0008877 | A1 | 1/2023 | Ding |

OTHER PUBLICATIONS

International Search Report and Written Opinion of the International Searching Authority, mailed on Nov. 25, 2022, from International Application No. PCT/US2022/036293, filed on Jul. 7, 2022. 10 pages.
Saki Seda et al., "Fabrication and characterization of silane- functionalized Na-bentonite polysulfon/polyethylenimine nanocomposite membranes for dye removal," Journal of Applied Polymer Science, vol. 137, No. 36, Feb. 2020, 2 Pages.
International Preliminary Report on Patentability mailed on Jan. 25, 2024, from International Application No. PCT/US2022/036293, filed on Jul. 7, 2022. 7 pages.
Abbasi, A., et al., "Carbon dioxide adsorption on grafted nanofibrous adsorbents functionalized using different amines," Front. Energy Res., 7, Article 145: 1-14 (2019).
Akhtar, F., et al. Structuring Adsorbents and Catalysts by Processing of Porous Powders, J. EP. Ceramics Society, 34: 1643-1666 (2014).
Bui, M., et al., "Carbon capture and storage (CCS): the way forward," Energy Environ. Sci., 11, p. 1062 (2018).
Chao, C., et al., "Post combustion carbon capture," Renew. Sustain. Energy Rev., 138, 110490 (2021).
Choi, C., et al., "Metal organic frameworks immobilized polyacrylonitrile fiber mats with polyethylenimine impregnation for $CO_2$ capture," Microporous Mesoporous Mater., 296(110006): 1-13 (2020).
Cogswell, C.F., et al., "Effect of pore structure on $CO_2$ adsorption characteristics of aminopolymer impregnated MCM-36," Langmuir, 31, A-H (2015).
DeWitt, S.J.A., et al., "Critical comparison of structured contactors for adsorption based gas separation," Annu. Rev. Chem. Biomol. Eng., 9, p. 129 (2018).
Didas, S.A., et al., "Amine oxide hybrid materials for $CO_2$ capture from ambient air," Acc. Chem. Res., 48, 2680-2687 (2015).
Gelles, T., et al., "Recent advances in development of amine functionalized adsorbents for $CO_2$ capture," Adsorption, 26:1-46 (2019).
He, X., "A review of material development in the field of carbon capture and the application of membrane-based processes in power plants and energy-intensive industries," Energy Sustain. Soc., 8(34) 1-14 (2018).
Heldebrant, D.J., et al., "Water-lean solvents for post-combustion $CO_2$ capture: fundamentals, uncertainties, opportunities, and outlook," Chem. Rev., 117(14): 9594-9624 (2017).
Khalipour, R., et al., "Membrane-based carbon capture from flue gas: a review," J. Clean. Prod., 103, 286-300 (2015).
Labreche, Y., et al., "Post-spinning infusion of polyethylenimine) into polymer/silica hollow fiber sorbents for carbon dioxide capture," Chem. Eng. J., 221: 166-175 (2013).
Lashaki, M.J., et al., "Stability of amine functionalized $CO_2$ adsorbents: a multifaceted puzzle," Chem. Soc. Rev., 48: 1-89 (2019).
Rezaei, F., et al., "Structured Adsorbents in Gas Separation Processes," Separation and Purification Technology, 70: 243-256 (2010).
Samanta, A., et al., "Post combustion $CO_2$ capture using solid sorbents: A review," Ind. Eng. Chem. Res., 2012, 51, p. 1438 (2012).
Shi, X., et al., "Sorbents for the direct capture of $CO_2$ from ambient air," Angew. Chem. Int. Ed., 59:2-25 (2020).
Takagishi, T., et al., "Binding of metal ions by polyethylenimine and its derivatives," J. Polym. Sci. Polym. Chem Ed., 23: 2109-2116 (1985).
Varghese, A.M., et al., "$CO_2$ capture adsorbents functionalized by amine—bearing polymers: a review," Int. J. Greenh. Gas Control., 96(103005): 1-33 (2020).
Villalobos, L.F., et al., "Complexation-induced phase separation: preparation of composite membranes with a nanometer-thin dense skin loaded with metal ions," Nanolett., 15, A-F (2015).
Wang, F., et al., "$CO_2$ adsorption capacity of organic alkali sorbent CPEI from polyethylenimine," Ads. Sci. Techn., 2021(6629365): 1-18 (2021).
Wang, J., et al., "TEPA Impregnation of Electrospun Carbon Nanofibers for Enhanced Low-Level $CO_2$ Adsorption," Nano Convergence, 7(7):1-11 (2020).
Yoo, C., et al., "Self-supported branched poly(ethylenimine) materials for $CO_2$ adsorption from simulated flue gas," J. Mater. Chem. A., 7(19513) 1-10 (2012).
Zeng, S., et al., "Ionic liquid based $CO_2$ capture systems: structure, interaction and process," Chem. Rev., 117(14): 9625-9673 (2017).
U.S. Appl. No. 17/859,139, filed Jul. 7, 2022.

* cited by examiner

POROUS SOLID AMINE ADSORBENTS AND APPLICATIONS

RELATED APPLICATIONS

This application claims the benefit under 35 USC 119(e) of: U.S. Provisional Application No. 63/220,734, filed on Jul. 12, 2021, U.S. Provisional Application No. 63/220,745, filed on Jul. 12, 2021, U.S. Provisional Application No. 63/220,739, filed on Jul. 12, 2021, and U.S. Provisional Application No. 63/220,744, filed on Jul. 12, 2021, all of which are incorporated herein by this reference in their entirety.

BACKGROUND OF THE INVENTION

Carbon capture, utilization and storage (CCUS) generally refers to various technologies believed to play an important role in meeting global energy and climate goals. For instance, these technologies are considered by many as essential in keeping global temperature increases below 1.5 degrees centigrade (° C.).

CCUS involves capturing $CO_2$ from diluted gas streams, such as flue gas, air, etc. In the case of flue gas, the $CO_2$ concentration is in the range of 8 to 14 volume %; in the case of ambient atmospheric air, the $CO_2$ concentration is about 450 ppm. Currently, the upfront cost for $CO_2$ capture from a variety of streams is more than 80% of the total CCUS costs. In the case of direct air capture, the upfront cost for $CO_2$ capture is almost 99% of the total CCUS cost.

The primary method for $CO_2$ capture involves aqueous amine based solvent systems, such as Econamine FG+, KS-1, Oase Blue, and Cansolv. However, these amine-based systems suffer from high energy loss from regenerating the solvent (due to boiling and condensing 70% of water). Another significant energy penalty is the energy consumed for pumping a large amount of viscous solvents during solvent circulation. Furthermore, solvent based systems suffer from water loss and solvent loss and large amount of water and solvent—have to be replenished. Also, the solvent loss itself contributes to global emissions and is a potential health hazard. A discussion of disadvantages associated with these techniques can be found in review articles such as: *Water-lean solvents for post-combustion $CO_2$ capture: fundamentals, uncertainties, opportunities, and outlook*, by D. J. Heldebrant, P. K. Koech, V. Glezakou, R. Rousseaau, D. Malhotra, and D. C. Cantu, Chem. Rev., 2017, 117, page 9594; and *Ionic liquid based $CO_2$ capture systems: structure, interaction and process*, by S. Zeng, X. Zhang, L. Bai, X. Zhang, H. Wang, J. Wang, D. Bao, M. Li, X. Liu, and S. Zhang, Chem. Rev., 2017, 117, page 9625.

Gas separation membranes have been proposed for flue gas $CO_2$ capture. For example, U.S. Pat. Nos. 8,025,718; 9,000,533; 9,140,186; 9,146,035; 9,782,718; and 9,856, 769 describe membrane-based flue gas capture processes utilizing a permeate sweep. However, these processes require furnace modifications, an extremely challenging requirement for an existing plant. In addition, membrane processes can suffer from low membrane selectivity, low productivity, and sensitive towards many contaminants. An in depth discussion regarding membrane based $CO_2$ capture processes can be found in the following articles: *Membrane-based carbon capture from flue gas: a review*, by R. Khalipour, K. Mumford, H. Zhai, A. Abbas, G. Stevens, and E. S. Rubin, J. Clean. Prod., 2015, 103, page 286; and *A review of material development in the field of carbon capture and the application of membrane-based processes in power plants and energy-intensive industries*, by X. He, Energy Sustain. Soc., 2018, 8, page 34.

Solid adsorbents for $CO_2$ capture have been viewed as the most promising alternative to aqueous amine-based systems. Solid adsorbents exhibit lower heat capacities, can use low value waste heat, do not consume energy for liquid pumping and do not generate solvent emissions, as described, for example, in *Post combustion $CO_2$ capture using solid sorbents: A review*, by A. Samanta, A. Zhao, G. K. H. Shimizu, P. Sarkar, and R. Gupta, Ind. Eng. Chem. Res., 2012, 51, page 1438, and *Carbon capture and storage (CCS): the way forward*, by M. Bui, et al., Energy Environ. Sci., 2018, 11, page 1062.

Based on the adsorption mechanism, solid adsorbents can be divided into physical sorbents and chemical sorbents. Typical physical sorbents include zeolites, activated carbons, porous polymers, metal organic frameworks (MOFs), etc. These materials rely on week Van Der Waals force between $CO_2$ and their very small pores but can suffer from low $CO_2$ selectivity and sensitivity towards moisture. See, for example, *Post combustion carbon capture*, by C. Chao, Y. Deng, R. Dewil, J. Baeyens, and X. Fan, Renew. Sustain. Energy Rev., 2021, 138, 110490; and *Post combustion $CO_2$ capture using solid sorbents: A review*, by A. Samanta, A. Zhao, G. K. H. Shimizu, P. Sarkar, and R. Gupta, Ind. Eng. Chem. Res., 2012, 51, page 1438.

Chemical sorbents rely on chemical interaction between $CO_2$ and the function groups on the sorbents. As a result, they tend to exhibit a much higher $CO_2$ selectivity. Most studied chemical sorbents are porous substance decorated with functional amine groups, as seen, for example, in *Recent advances in development of amine functionalized adsorbents for $CO_2$ capture*, by T. Gelles, S. Lawson, A. A. Rownaghi, and F. Rezaei, Adsorption, 2020, 26, page 5; and *$CO_2$ capture adsorbents functionalized by amine-bearing polymers: a review*, Int. J. Greenh. Gas Control., 2020, 96, 103005.

Depending on the methods of preparation, supported amine adsorbents have been classified into three classes. Class I adsorbents are prepared by physical impregnation of amine polymers into the porous supports, such as porous carbon, silica, MOF, zeolite, and polymers. Class II adsorbents are prepared by surface grafting of the amine polymers onto the porous surface, such as those tethered by silane linkage. Class III adsorbents are prepared by in situ polymerization utilizing amine containing monomers. See, e.g., *Amine-oxide hybrid materials for $CO_2$ capture from ambient air*, by S. A. Didas, S. Choi, W. Chaikittsilp, and C. W. Jones, Acc. Chem. Res., 2015, 48, page 2680.

Generally, class II and Class III adsorbents exhibit relatively low $CO_2$ capture capability due to much lower amine loading. For the preparation of Class I adsorbents, the need to deposit the amine compound into the small pores of the substrates leads to selecting amine compounds having low molecular weight. As the result, Class I adsorbents suffer from relatively low thermal stability, often due to evaporation of the low molecular weight amines.

Utilization of a higher molecular weight amine polymers could address this degradation. However, due to the limitation imposed by the support pore sizes, higher molecular weight molecules cannot be utilized without blocking the pore opening, as discussed, for instance, in the following references: *Stability of amine functionalized $CO_2$ adsorbents: a multifaceted puzzle*, by M. J. Lashaki, S. Khiavi, and A. Sayari, Chem. Soc. Rev., 2019, 48, page 3320; *Sorbents for the direct capture of $CO_2$ from ambient air*, by X. Shi, H. Xiao, H. Azarabadi, J. Song, X. Wu, X. Chen, and K. S. Lackner, Angew. Chem. Int. Ed., 2020, 59, page 2; and *Effect of pore structure on $CO_2$ adsorption characteristics of aminopolymer impregnated MCM-36*, by C. F. Cogswell, H. Jiang, J. Ramberger, D. Accetta, R. J. Willey, and S. Choi, Langmuir, 2015, 31, page 4534.

Conventional adsorbents usually come in beads or pellets, typically from 1 to 6 mm in diameter. Adsorbent beds that are packed with beads or pellets, however, typically suffer from low bed packing, high pressure drop, and attrition. Structured sorbents like monoliths and fibers offer improvement over traditional bead or pellet packed bed structure. See, for example, *Critical comparison of structured contactors for adsorption based gas separation*, by S. J. A. DeWitt, A. Sinha, J. Kalyanaraman, F. Zhang, M. J. Realff, and R. P. Lively, Annu. Rev. Chem. Biomol. Eng., 2018, 9, page 129. U.S. Pat. Nos. 8,133,308 and 8,377,172 discloses a hollow fiber adsorbent formed from a dope composition containing a water insoluble polymer and a particular inorganic adsorbent. These inorganic adsorbents do not contain an amine functional groups. Attempts to prepare cellulose acetate along with polyethylenimine (PEI) modified mesoporous silica were unsuccessful, due to loss of PEI during solvent exchange. Instead, PEI had to be infused into the hollow fiber post spinning. See, e.g., *Post-spinning infusion of polyethylenimine*) *into polymer/silica hollow fiber sorbents for carbon dioxide capture*, by Y. Labreche, R. P. Lively, F. Rezari, G. Chen, C. W. Jones, and W. J. Koros, Chem. Eng. J., 2013, 221, page 166. European Patent Application No. 2,266,680 discloses a method for coating fibrous carbon with a PEI mixture containing a crosslinking agent. The paper entitled *Carbon dioxide adsorption on grafted nanofibrous adsorbents functionalized using different amines* by A. Abbasi, et al, Front. Energy Res., 2019, 7, page 145, describes methods of grafting amines onto electrospun nanofiber polypropylene by radiation induced grafting. The article entitled *Metal organic frameworks immobilized polyacrylonitrile fiber mats with polyethylenimine impregnation for $CO_2$ capture* by C. Choi, R. L. Kadam, S. Gaikwad, K Hwang, and S. Han, Microporous Mesoporous Mater., 2020, 296, article 110006, describe materials prepared by impregnating the polyacrylonitrile (PAN) fibers with low molecular weight PEI. U.S. Pat. Nos. 8,597,411; 8,974,577; and 9,457,340 disclose coating solutions containing PEI and a crosslinking agent that are used for coating a variety of high surface area substrates.

Porous solid amines possess highly desirable $CO_2$ adsorption capability. For example, the article entitled *Self-supported branched poly(ethylenimine) materials for $CO_2$ adsorption from simulated flue gas*, by C. Yoo, P. Narayanan, and C. W. Jones, J. Mater. Chem. A., 2019, 7, page 19513, presents a method for preparing porous polyethylenimine by crosslinking with poly(ethylene glycol) diglycidyl ether and ice templating. A method for preparing crosslinked polyethylenimine particles by mixing a PEI acid solution with glutaraldehyde, followed by neutralization with a NaOH solution is described in *$CO_2$ adsorption capacity of organic alkali sorbent CPE1 from polyethylenimine*, by F. Wang, L. Yu, Y. Li, and D. Huang, Ads. Sci. Techn., 2021, article 6629365.

The article entitled *Binding of metal ions by polyethylenimine and its derivatives* by T. Takagishi, S. Okuda, N. Kuroki, and H. Kozuka, in J. Polym. Sci. Polym. Chem Ed., 1985, 23, 2109, describe the binding ability of primary amines towards metal ions. However, the article does not indicate that a solid functional article could be formed. U.S. Pat. No. 10,696,025 and the article entitled *Complexation-induced phase separation: preparation of composite membranes with a nanometer-thin dense skin loaded with metal ions*, by L. F. Villalobos, M. Karunakaran, and K.-V. Peinemann, in Nanolett., 2015, 15, page 3166 discloses methods to prepare thin composite membranes by first contacting a dope solution with a metal ion solution and then with a nonsolvent. The dope includes a nonwater soluble polymer containing chelating ligands.

SUMMARY OF THE INVENTION

As seen above, high performing and cost-effective $CO_2$ capture technologies continue to present considerable challenges. In spite of the various efforts, it has been found that even highly crosslinked polyethylenimine forms a sticky structure which prevents industrial applications, as pointed out in European Patent Application No. 2,266,680.

A need exists, therefore, for approaches that address at least some of these challenges. Processes for the manufacture of porous solid amine adsorbents suitable for the removal of carbon dioxide and/or other acid gases directly from ambient air or from gas streams such as air, flue gases, biogas, hydrogen, natural gas, liquefied natural gas (LNG), etc., are particularly desired.

It was discovered that porous solid amine adsorbents can be prepared by bringing together two solutions.

The first solution includes: (i) an amine-containing compound, such as, for instance, a water-soluble amine-containing polymer; and (ii) a polymer, typically a water insoluble polymer. These two constituents can be combined in a polar solvent. Optionally, the first solution can include other constituents, such as, for instance, a nonsolvent component and/or an additive component, e.g., a particulate material. In some embodiments, when preparing hollow fibers, for instance, the first solution can be considered the dope solution.

The second solution is an aqueous solution that includes a multifunctional chemical agent that reacts rapidly with an amine functional group. The multifunctional chemical agent can include a multifunctional metal ion, or a multifunctional acid. In many implementations, the multifunctional metal ion is provided as part of a multifunctional metal salt that is soluble in water. In other implementations, the multifunctional acid is a water-soluble inorganic or organic multifunctional acid. Mixtures of multifunctional chemical agents can be employed in some cases.

Contact between the first and second solution yields porous solid amine adsorbents. A porous solid adsorbent material (mass), for example, can be obtained by simply combining the two solutions, e.g., by adding the first solution to the second solution. In many instances, however, the porous solid amine adsorbents are prepared in specific shapes or forms, using methods and/or tools currently known in the art or developed in the future.

Thus, in one embodiment, a method for preparing a porous solid adsorbent sheet comprises directing a first solution through a film die into an aqueous solution containing a multifunctional chemical agent to form the porous solid adsorbent sheet.

In another embodiment, a method for preparing a solid adsorbent material, in the form of beads, comprises bringing droplets of the first solution into contact with an aqueous solution containing a multifunctional chemical agent to form a porous solid material in the form of beads.

In a further embodiment, a method for preparing a porous solid adsorbent fiber comprises directing a first solution (dope) through a spinneret into an aqueous solution comprising a multifunctional chemical agent to form the porous solid adsorbent fiber.

In yet another embodiment, a method for preparing a porous hollow fiber comprises directing a first solution (dope) through a spinneret; injecting a bore fluid (such as, for example, water, or a water-based mixture containing one or more polar organic solvents, or a solution containing a multifunctional chemical agent) through an inner orifice of the spinneret; and bringing the first solution into contact with an aqueous solution containing a multifunctional chemical agent to form the porous hollow fiber.

The product, e.g., in sheet, beads, fiber, hollow fiber, monolith, or another form, can be further processed, by washing, drying, and/or heating, for example.

The porous solid amine adsorbents can find applications in the capture of acid gases such as carbon dioxide, hydrogen sulfide, sulfur oxides, and so forth. Thus, in another of its aspects, the invention features a method for removing an acid gas from a fluid stream containing the acid gas. The method includes contacting the fluid stream (a flue gas, for instance) with a porous solid amine adsorbent, e.g., prepared as described above, to adsorb at least a portion of the acid gas present in the fluid stream onto the porous solid amine adsorbent and produce a purified fluid stream (i.e., a fluid stream that is depleted with respect to the acid gas). In illustrative examples, the porous solid adsorbent is in the form of a fiber, a hollow fiber, a sheet or beads.

After acid gas has been captured, the porous solid amine adsorbent (in the form of beads, adsorbent mass, fiber, sheet, solid article, etc.) can be regenerated, releasing the adsorbed acid gas, employing techniques known in the art or developed in the future; the desorbed acid gas (e.g., $CO_2$) can be used for enhanced oil recovery, producing synthetic fuels, such as methanol, methane, jet fuels, etc., or can be injected underground for storage.

Aspects of the invention also can be practiced or adapted for the direct removal of acid gases from the ambient atmosphere, such as in the direct air capture of carbon dioxide.

Practicing aspects of the invention has many advantages. Manufacturing approaches described herein offer flexibility and ease, at acceptable cost. In many cases, reactions described herein can be very rapid, requiring short residence times for bringing the two solutions in contact with one another, thus offering any number of options for fast-paced batch, semi-continuous or continuous manufacturing schemes.

The resulting porous solid amine adsorbents can be self-supporting and robust. They can be prepared in diverse forms, including any number of solid articles, such as beads, sheets, fibers, hollow fibers, monoliths and so forth. They can be packaged into devices with structured packaging and can be very effective in capturing and storing carbon dioxide and/or other acid gases, representing a needed tool in emission control and climate change mitigation.

The porous solid amine adsorbents prepared as described herein do not display sensitivity to water and require low energy for regeneration. Their use circumvents the emission problems encountered with organic amine solvents and eliminates solvent pumping and/or water or organic solvent replenishing requirements posed by many existing techniques for the capture of carbon dioxide.

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Also, all conjunctions used are to be understood in the most inclusive sense possible. Thus, the word "or" should be understood as having the definition of a logical "or" rather than that of a logical "exclusive or" unless the context clearly necessitates otherwise. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention generally relates to porous solid amine adsorbents and methods for preparing and/or using them. The adsorbents can be produced in the form of fibers, hollow fibers, beads, sheets, or other articles, and can find applications in the context of CCUS, a term sometimes used interchangeably with the term "carbon capture and storage" or CCS, in attempts to lower anthropogenic emissions of carbon dioxide ($CO_2$) in the atmosphere and limit the effects of global climate change.

The porous solid amine adsorbents described herein can be prepared by contacting a first solution with a second solution.

For some applications, the first solution is referred as a "dope" solution. In the context of hollow fiber membrane manufacture, for instance, a dope refers to a blend of polymers, solvent and, optionally, other constituents, that passes through the annular space of a spinneret to form a nascent hollow fiber membrane.

Among the constituents of the first solution is an amine-containing compound (a substance that includes functional groups such as —$NH_2$, —RNH, or —RR'N), and another polymer.

In specific embodiment, the amine-containing compound is a water-soluble amine-containing polymer. As used herein, the term "amine-containing polymer" or "amine polymer" refers to polymers that contain —$NH_2$, —RNH, or —RR'N functional groups attached to/separated by —$CH_2CH_2$—, —$CH_2CH_2CH_2$—, or —$CH_2CH_2CH_2CH_2$—. The R and R' groups can be methyl, ethyl, propyl, etc. groups and can be the same or different.

The water-soluble amine polymer can be provided in a wide range of molecular weights, from about 400 to about 10,000,000, for example. Some implementations utilize a water-soluble amine polymer within a range of from about 1,000 to about 1,000,000.

Blends of water-soluble amine polymers also can be employed.

In one example, the water-soluble amine compound (e.g., polymer) includes a unit skeletal structure represented by Formula 1:

(1)

In the unit skeletal structure, R may be hydrogen or a branched chain, such as, for example, branched hydrocar-bons, branched polyethylenimine and so forth; x is an integer of 1 to 4, and y is an integer of 2 to 1,000,000. In specific implementations, the amine compound is a linear or branched polyethylenimine (for x=2) or a linear or branched polypropylenimine (for x=3).

In another example, the water-soluble amine compound (e.g., polymer) includes a structure represented by Formula 2:

(2)

where x is an integer of 1 to 4 and y is an integer of 2 to 1,000,000. In specific implementations, the amine compound represented by Formula 2 is a polyvinylamine (in the case of x=1).

Many linear or branched polypropylenimines or polyvinylamines are commercially available (from companies such as BASF, Nippon Shokubai or other suppliers). Custom-made such compounds also can be employed.

The amount of the water-soluble amine compound can be within a range of from about 5 to about 50% based on the total weight of the first (e.g., dope) solution. In illustrative examples, the amount of amine compound is within a range of from about 5 to about 10, from about 5 to about 15, from about 5 to about 20, from about 5 to about 25, from about 5 to about 30, from about 5 to about 35, from about 5 to about 40, from about 5 to about 45%; or from about 10 to about 15, from about 10 to about 20, from about 10 to about 25, from about 10 to about 30, from about 10 to about 35, from about 10 to about 40, from about 10 to about 45, from about 10 to about 50%; or from about 15 to about 20, from about 15 to about 25, from about 15 to about 30, from about 15 to about 35, from about 15 to about 40, from about 15 to about 45, from about 15 to about 50%; or from about 20 to about 25, from about 20 to about 30, from about 20 to about 35, from about 20 to about 40, from about 20 to about 45, from about 20 to about 50%; or from about 25 to about 30, from about 25 to about 35, from about 25 to about 40, from about 25 to about 45, from about 25 to about 50%; or from about 30 to about 35, from about 30 to about 40, from about 30 to about 45, from about 30 to about 50%; or from about 35 to about 40, from about 35 to about 45, from about 35 to about 50%; or from about 40 to about 45, from about 40 to about 50%; or from about 45 to about 50%.

The water-soluble amine polymer can be partially crosslinked by reacting with a crosslinking agent to increase the molecular weight. Partial crosslinking is beneficial in some cases to increase the dope solution viscosity and final sorbent adsorption capacity. The degree of partial crosslinking is controlled below the gelling point of the solution and is often achieved by adding to the solution a controlled amount of crosslinking agent. Suitable crosslinking agents include glyoxal, glutaraldehyde, bisphenol A diepoxy, isocynate, divinyl sulfone, metal cations, and the like. In one illustrative embodiment, the crosslinking agent is bisphenol A diepoxy.

The first solution also includes another constituent, typically a water insoluble polymer. The water insoluble polymer forms a porous polymeric structure upon contact with a solvent such as water, providing a mechanical support for the porous solid amines formed from the reaction involving the multifunctional chemical agent (in the second solution). In the absence of a water insoluble polymer, the porous solid amine adsorbent will be sticky and difficult to shape into a desired configuration.

Water insoluble polymers that can be employed to prepare the first solution can be natural or synthetic. Examples of natural polymers include lignin, cellulose, cellulose derivatives, (such as cellulose acetates, for instance), and others. Examples of synthetic polymers include polyacrylonitrile, poly(methyl methacrylate), polystyrene, poly(ethylene terephthalate), aromatic polyamides, aliphatic polyamides, polyesters, polyetherketones, polyethersulfones, polyetheresters, polysulfones, polyvinyl fluoride, polybenzimidazoles, polybenzoxazoles, polyazoaraomatics, poly(2,6-dimethylphenylene oxide), polyphenylene oxides, polyureas, polyurethanes, polyhydrazides, polyazomethines, polyacetals, polyquinoxaline, polyamideesters, polyacetylenes, polymer with intrinsic porosities (PIMs), polyesters, any combinations (blends) or copolymers thereof.

Many embodiments of the invention utilize water insoluble polymers that exhibit a glass transition temperature or a melting point above 100° C. Advantageously, such polymers are expected to withstand temperatures employed during the thermal regeneration of the adsorbent, without a significant pore collapse.

The amount of water-insoluble polymer in the first solution can be within a range of from about 5 to about 50 weight %, such as, for example, within a range of from about 5 to about 10, from about 5 to about 15, from about 5 to about 20, from about 5 to about 25, from about 5 to about 30, from about 5 to about 35, from about 5 to about 40, from about 5 to about 45%; or from about 10 to about 15, from about 10 to about 20, from about 10 to about 25, from about 10 to about 30, from about 10 to about 35, from about 10 to about 40, from about 10 to about 45, from about 10 to about 50%; or from about 15 to about 20, from about 15 to about 25, from about 15 to about 30, from about 15 to about 35, from about 15 to about 40, from about 15 to about 45, from about 15 to about 50%; or from about 20 to about 25, from about 20 to about 30, from about 20 to about 35, from about 20 to about 40, from about 20 to about 45, from about 20 to about 50%; or from about 25 to about 30, from about 25 to about 35, from about 25 to about 40, from about 25 to about 45, from about 25 to about 50%; or from about 30 to about 35, from about 30 to about 40, from about 30 to about 45, from about 30 to about 50%; or from about 35 to about 40, from about 35 to about 45, from about 35 to about 50%; or from about 40 to about 45, from about 40 to about 50%; or from about 45 to about 50%.

The first solution can be prepared by combining the water insoluble polymer and the water-soluble amine polymer in a polar solvent. In many implementations, the polar solvent is an organic liquid that is miscible with water. It can dissolve the amine polymer as well as the water-insoluble polymer. Examples include but are not limited to ethanol, propanol, n-butanol, tetrahydrofuran (THF), dimethylformamide (DMF), dimethylacetamide (DMAc or DMA), dimethylsulfoxide (DMSO), N-methyl pyrrolidone (NMP), or mixtures thereof. Other polar solvents can be employed.

The polar solvent can be present in the first solution in an amount within a range of from about 50 to about 90% based on the weight of the first solution.

The first solution can be a homogeneous solution in which all three components, namely the water-insoluble polymer, the water-soluble amine polymer and the polar solvent, are miscible.

The first solution can include other ingredients such as, for instance, a non-solvent component and/or a particulate material.

The nonsolvent component can be liquid or solid and can be selected to serve any number of functions: viscosity modifications, imparting porosity and/or other properties to the adsorbent product, or for other purposes. Examples of nonsolvents that can be employed include but are not limited to water, aliphatic alcohols, particularly polyhydric alcohols such as ethylene glycol, glycerine, etc., polyethylene oxides and polypropylene oxides, polyvinylalcohol, polyvinylpyrolidone, surfactants such as alkylaryl polyether alcohols, alkyl sulfates, alkylarylsulfates, etc., triethylphosphate, formamide, and salts such as lithium chloride, etc. Combinations of nonsolvents also can be used.

The nature and amount of the nonsolvent can depend on desired product properties, process and/or equipment parameters or other factors. In general, the amount of nonsolvent can be within a range of from about 0% to about 30% based on the weight of the first solution.

The particulate component can be in the form of inorganic or organic particles. In many cases, the particles are porous, displaying macroporosity, microporosity and/or nanoporosity. Examples include but are not limited to carbon materials (such as carbon nanoparticles, e.g., carbon nanotubes), graphenes, graphene oxides, zeolites, silicas, aluminosilicates, intercalation compounds, metal organic frameworks (MOFs), porous aromatic frameworks (PAFs), covalent organic frameworks (COFs), and others.

The particulate constituent can be present in an amount within a range of from about 0% to about 30% based on the weight of the first solution.

The first solution can be prepared by mixing or blending ingredients (constituents) using techniques and equipment known in the art or developed in the future. In one illustration, the water-soluble amine compound and the water insoluble polymer are dissolved in the polar solvent. Solution constituents can be combined together in one or more steps. For example, if a nonsolvent or a particulate material is employed, it can be added in a single step, along with the other ingredients, to another ingredient, or to a pre-blend of other ingredients.

The second solution contains a multifunctional chemical agent, such as, for instance, a multifunctional metal ion or a multifunctional acid.

In one embodiment, the second solution is an aqueous solution containing a (multifunctional) metal ion, i.e., a metal ion that can form a multiligand complex. Water can be present in the second solution in an amount that is at least 80% based on the total weight of the aqueous solution, preferably in an amount equal or greater than 95 wt %.

Examples of multifunctional metal ions that can be employed include $Cu^+$, $Cu^{2+}$, $Ca^{2+}$, $Ni^{2+}$, $Zn^{2+}$, $Pd^{2+}$, $Mg^{2+}$, $Co^{2+}$, $Cr^{2+}$, $Fe^{2+}$, $Fe^{3+}$, and others. The selection of the metal ion concentration will depend on the nature of the metal ion, the dwelling time of the first solution (e.g., dope) in the metal ion solution, solution temperature, the desired metal concentration in the final adsorbents or other factors. The use of metal ions can be advantageous due to their low cost and, in some cases, synergistic $CO_2$ adsorption effect.

The concentration of the metal ions in the solution may be in the range of 0.001M to 5M, preferably in the range of 0.01M to 2M.

The multifunctional metal ion can be conveniently provided by using a water-soluble metal salt. Examples include soluble sulfates, phosphates, chlorides, acetates or other salts of inorganic or organic acids. Preferred compounds are those that completely dissociate when added to water.

In another embodiment, the second solution is an aqueous solution containing a multifunctional (multivalent) acid, i.e., an acid having two or more acid functional groups. The multifunctional acid can be an inorganic acid, such as sulfuric acid or phosphoric acid, or an organic acid. Examples of suitable multifunctional organic acids (having two or more —COOH groups) include oxalic acid, citric acid, malic acid, tartaric acid, humic acid, dithiodipropionic acid, succinic acid, sulfosuccinic acid, phytic acid, trans aconitic acid, polyacrylic acid and its copolymers, polyvinylphosphonic acid and its copolymers, polystyrene sulfonic acid and its copolymers, polystyrene phosphonic acid and its copolymers, polystyrene carboxylic acid and its copolymers, and the like, or any mixtures thereof.

In one illustration, the acid concentration in the aqueous solution is in the range of 0.01% to 30%, preferably in the range of 0.1% to 10% relative to the total weight of the aqueous solution.

In some cases, the second solution is simply a water solution containing a multifunctional chemical agent, such as an inorganic salt. An acid-water solution also can be employed.

In other embodiments, the second solution further includes one or more additive(s). Suitable additives can be in solid or liquid form and are typically selected to facilitate the formation of the adsorbent product. Examples of additives that can be used in formation of the solid adsorbents are aliphatic alcohols, particularly polyhydric alcohols such as ethylene glycol, glycerine, etc., polyethylene oxides and polypropylene oxides; surfactants such as alkylaryl polyether alcohols, alkyl sulfates, alkylarylsulfates, sodium lauryl sulfoacetate, etc.; triethylphosphate, formamide, and salts such as lithium chloride, etc.

Amounts of additive can be within a range of from about 0.5% to about 20% relative to the weight of the second solution.

The second solution (containing a multifunctional chemical agent in an aqueous medium) can further include a multifunctional crosslinking agent, such as, in many cases, a multifunctional aldehyde, or a multifunctional epoxide, such as, for example, glyoxal, glutaraldehyde, bisphenol A diepoxy, divinyl sulfone, and the like. In one illustrative embodiment, the crosslinking agent is glutaraldehyde.

Amounts of crosslinking agents that can be employed are within a range of from about 0.001 M to about 5 M.

The properties of the first and/or second solution can be tailored depending, for instance, on the equipment or technique employed to prepare the porous solid amine adsorbents, desired product attributes, scale, or other factors.

To illustrate, the first solution can be provided and/or maintained at a temperature within a range of from about 20° C. to about 80° C., preferably in the range of 25° C. to about 60° C. In many implementations, the second solution is provided and/or maintained at a temperature within a range between 20° C. and 80° C., preferably in the range of 25 to 60° C.

For specific applications, the viscosity of the first solution is within a range of from about 1,000 to about 10,000,000 centipoise, preferably in the range of 5,000 to 1,000,000 centipoise. The second solution can have a lower, often significantly lower viscosity, e.g., within a range of from about 0.5 to about 10 centipoise, preferably in the range of 0.8 to 5 centipoise.

In one implementation, the ratio of the first to the second solution is within a range of from about 0.00001 to about 0.5 by weight. In the context of continuous manufacturing, the second solution can be maintained constant dynamically, e.g., by removing a portion of the solution that has been exposed to the first solution and adding a desired amount of fresh solution. The amount of the aqueous solution removed and added depends on the production volume, total volume of the second solution, temperature, as well as the composition of the first solution.

Porous solid amine adsorbents are prepared by bringing together the two solutions. In many cases the product is formed rapidly, e.g., in a matter of seconds.

Without wishing to be bound by any particular theory or interpretation, it is believed that once the first solution (e.g., dope) is brought into contact with the aqueous solution containing a multifunctional chemical agent (i.e., the second solution), the water insoluble polymer chain is frozen into solid state by a non-solvent induced phase inversion, while the water soluble amine compound is frozen into solid state by a rapid crosslinking reaction between a primary amine functional group and the multifunctional chemical agent. It is further believed that during the process of phase inversion, a crosslinking agent such as glutaraldehyde diffuses into and through the solid polymer matrix, further promoting the crosslinking of the water soluble amine polymer (e.g., PEI). Without the multifunctional chemical agent, the water-soluble amine compound would become rapidly diffused into the water solvent precluding the formation of a functional adsorbent.

Figure 1:
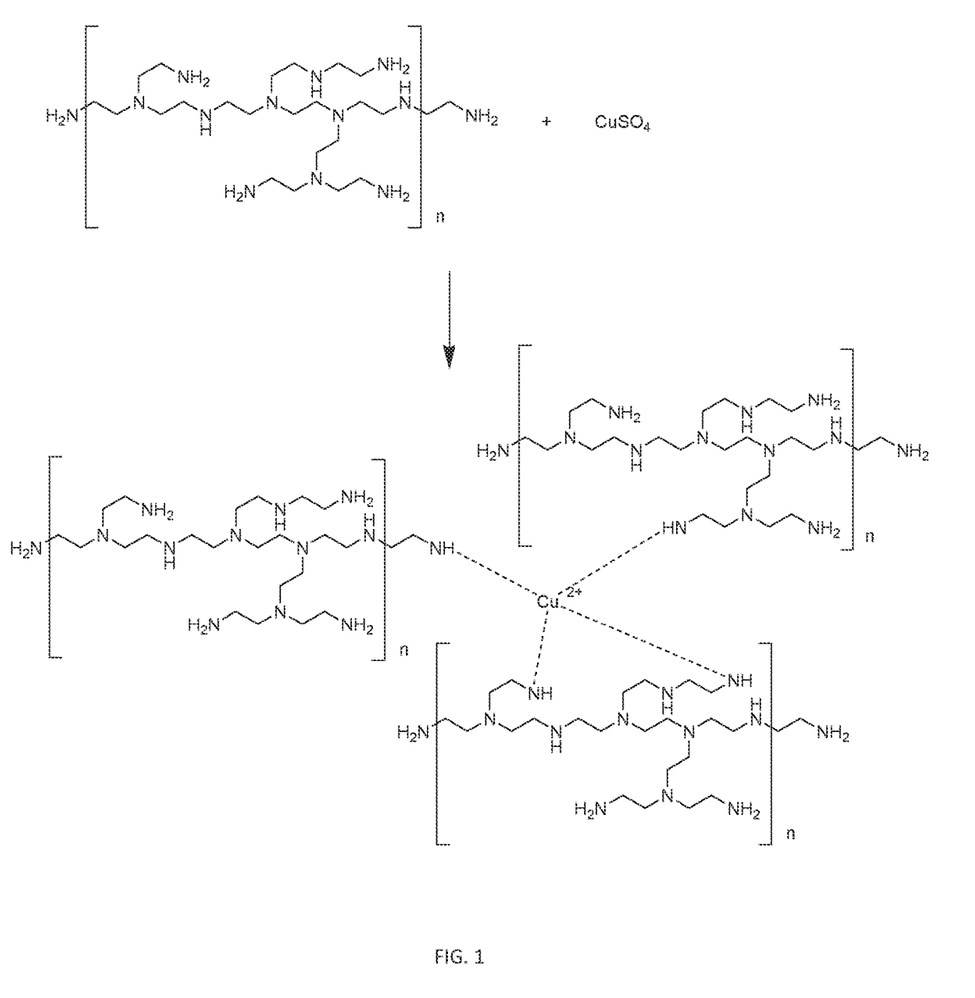
FIG. 1 is a diagram showing a plausible mechanism for the $Cu^{2+}$ induced phase separation of PEI.
Figure 2:
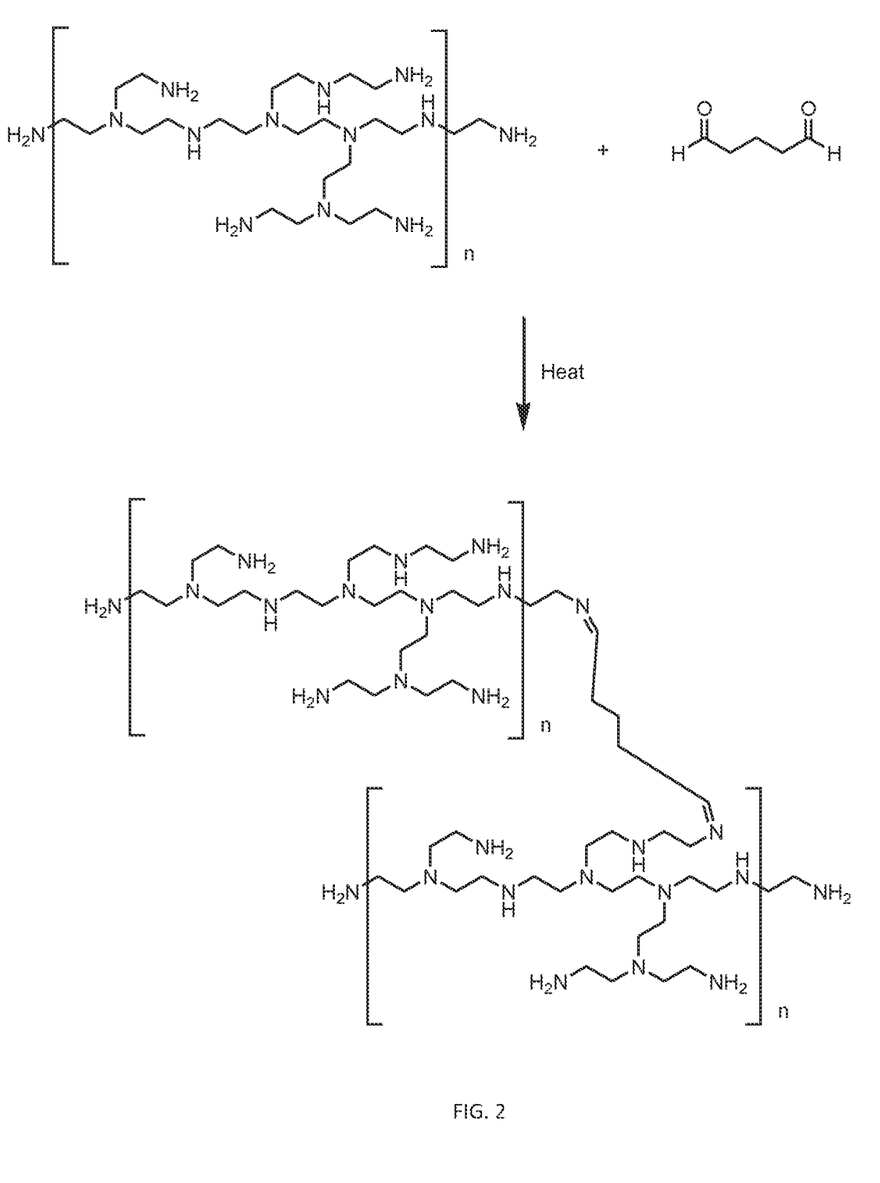
FIG. 2 is a diagram showing a plausible mechanism for the PEI crosslinking by glutaraldehyde in the presence of heat.
Figure 3:
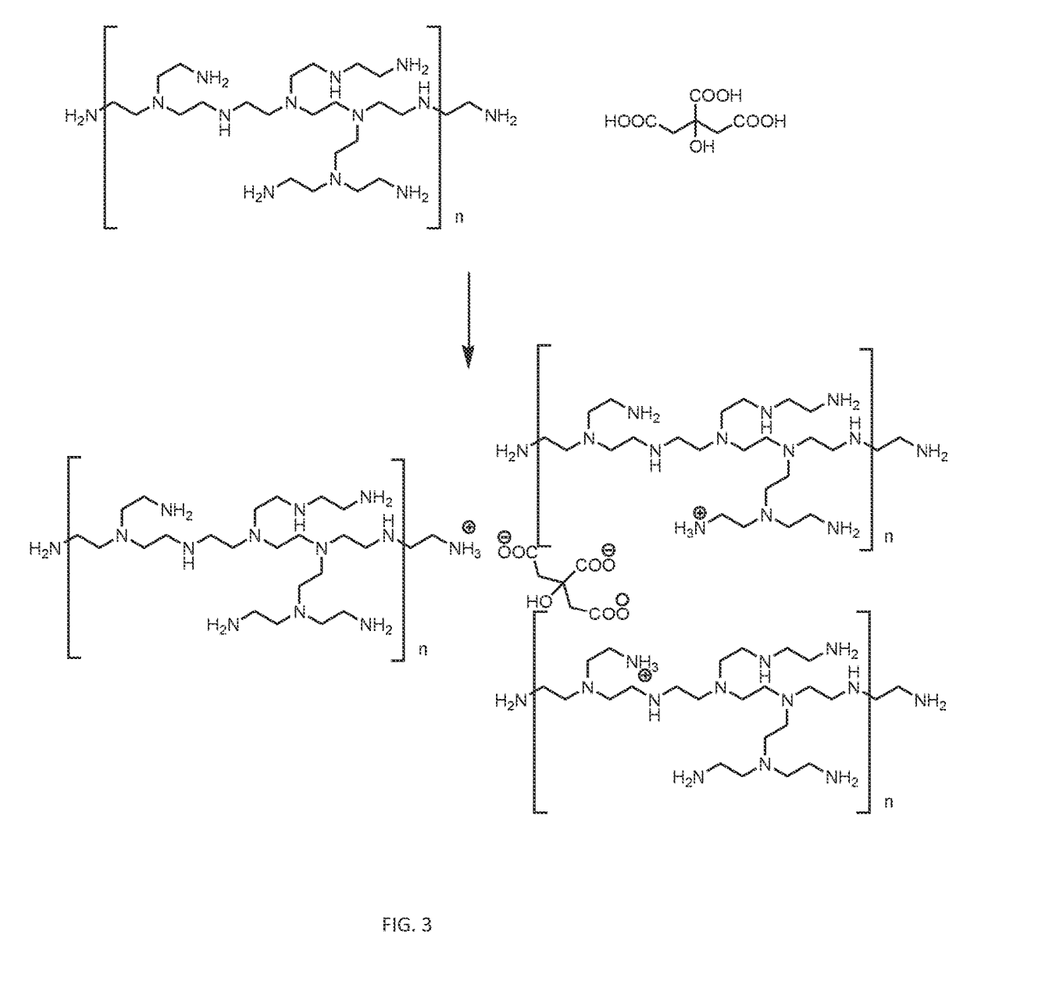
FIG. 3 is a diagram showing a plausible mechanism for the acid induced phase separation of PEI by citric acid.
Figure 4:
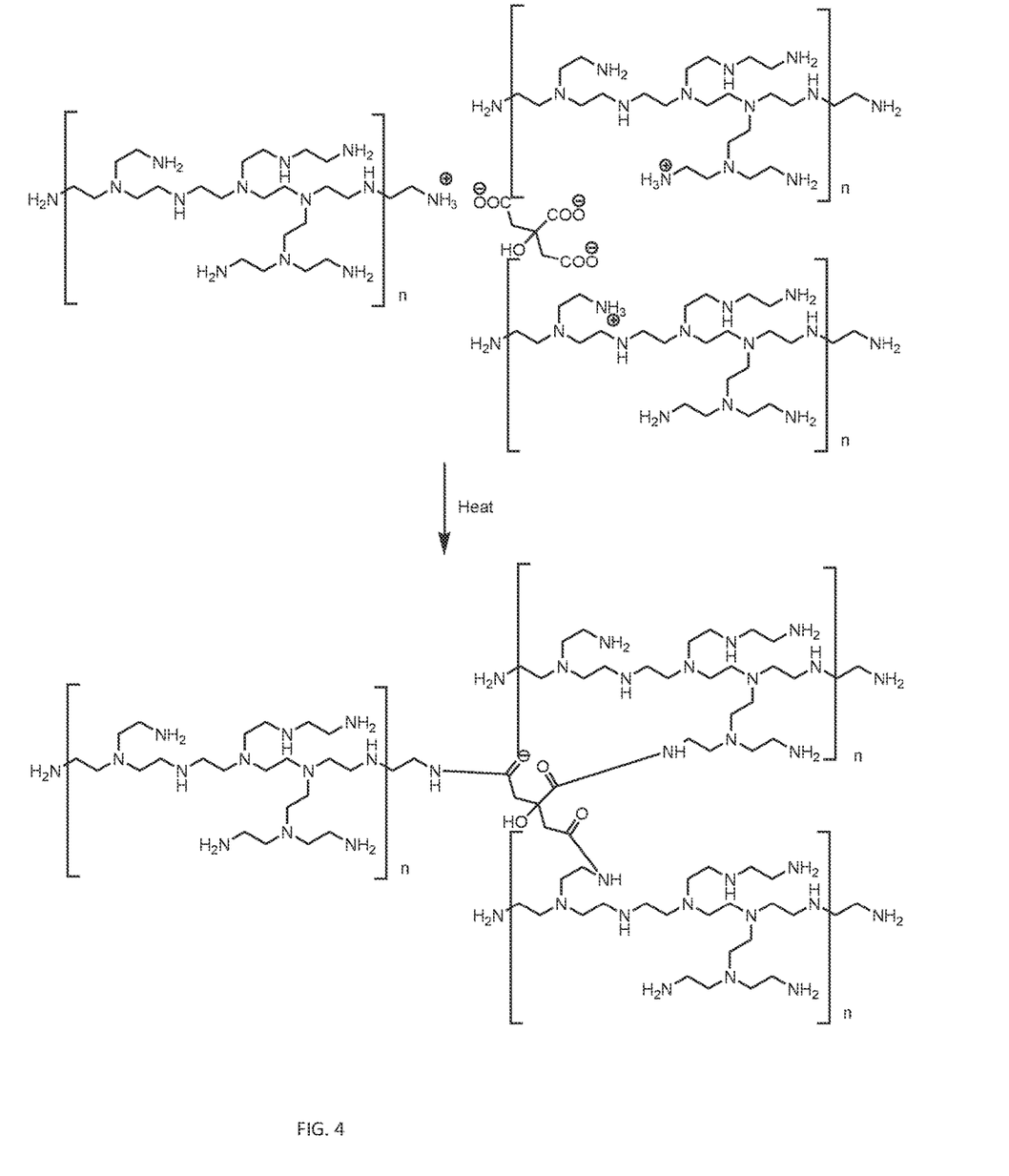
FIG. 4 is a diagram showing a plausible PEI crosslinking mechanism by citric acid in the presence of heat.

A plausible mechanism for the phase separation of PEI induced by a multifunctional metal ion ($Cu^{2+}$) is illustrated in FIG. 1. FIG. 2 shows a plausible PEI crosslinking mechanism by glutaraldehyde in the presence of heat. FIG. 3 illustrates the plausible mechanism for the phase separation of PEI induced by a multifunctional carboxylic acid (citric acid). FIG. 4 shows the plausible PEI crosslinking mechanism by citric acid in the presence of heat.

In practice, the first and second solutions can be brought together in various ways, taking advantage, for instance, of available processes and/or equipment employed to prepare a desired porous solid amine adsorbent. The manufacturing approach also can influence the relative amounts to be selected, the conditions, composition or properties of the two solutions, temperature, volume or other parameters.

Any number of materials or articles can be fabricated. An adsorbent mass can be generated, for example, by introducing the first solution (by pouring or dropwise), into a bath of a second solution. Articles in defined shapes or forms also can be manufactured.

In one embodiment, the porous solid amine adsorbent is fabricated as a hollow fiber using, for instance, a dry-wet solution spinning technique in which the first (dope) solution (containing a water insoluble polymer and a water-soluble amine polymer) is co-extruded (through an annular region of a spinneret) with a bore fluid, which can be water, a water/organic solvent mixture or a solution containing a multifunctional chemical agent. The nascent hollow fiber is directed through an air gap, then passed into a bath of an aqueous solution containing a multifunctional chemical agent (namely the second solution).

Obtaining hollow fibers of desired morphologies or properties may depend on factors such as spinneret design, dope and bore fluid flow rates and/or physical properties, air gap dimensions, bath conditions, shear forces within the spinneret, ratios of dope to bore fluid volumetric flow rates, draw ratios and so forth. U.S. Pat. No. 5,181,940, the entire contents of which are incorporated herein by this reference, provides details on the manufacture of hollow fiber membranes that may be found applicable.

The hollow fibers can be prepared in any desired inner and outer diameters, e.g., within a range of from about 2 mil to about 20 mil for the inner diameter, and from about 4 mil to about 50 mil for the outer diameter. Other properties characterizing the hollow fibers prepared as described herein (such as, for instance, surface porosity, e.g., in the range of 1% to 60% by area, number of fibers, e.g., in the range of 1 to 100) can be obtained by selecting or adjusting the equipment design, the process conditions or other factors.

To form a (non-hollow) porous solid fiber, the first (dope) solution (containing a water insoluble polymer and a water soluble amine polymer) can be extruded through a needle, passed through air, then brought into contact with the second solution (namely the aqueous solution containing a multifunctional acid). Techniques that can be followed or adapted are described, for example, in U.S. Pat. No. 5,181,940, except that no bore fluid is utilized.

In illustrative examples, the porous solid amine adsorbents are fabricated in fibers (which can be hollow or non-hollow) having any desired outer diameters, e.g., within a range of from about 5 mil to about 50 mil. Other properties characterizing the fibers prepared as described herein (such as, for instance, a surface porosity that can be in the range of 1% to 60% by area) can be obtained by selecting or adjusting the equipment design, the process conditions or other factors.

If a sheet adsorbent is desired, the first solution can be extruded through a film die and brought into contact with the aqueous solution containing the multifunctional chemical agent (second solution). Equipment and methods that can be employed are described, for instance, in U.S. Pat. No. 10,118,136, the entire contents of which are incorporated herein by this reference.

Sheet adsorbents can be prepared in any desired thickness, e.g., by selecting the appropriate die configuration. In one illustration, the sheet has a thickness within a range of form about 5 mil to about 50 mil. Sheet densities can vary, depending on the intended application.

Porous solid adsorbents also can be produced in the form of beads. Techniques that can be employed are described, for example, in U.S. Pat. No. 10,525,400, the entire contents of which are incorporated herein by this reference. To illustrate, the first solution can be sprayed through one or more orifices, e.g., using a suitable nozzle, to form droplets; after passing through air, the droplets are brought into contact with the second solution. Nozzle configuration, process parameters and/or and other factors can be selected or adjusted to prepare porous solid amine adsorbents in desired particulate sizes. In many cases, beads prepared as described herein will have an average size within a range of from about 5 mil to about 300 mil.

Molding, extrusions, etc. can be employed to shape other types of porous solid amine adsorbent articles.

Porous solid adsorbents can be further shaped into monoliths using a 3D-printing apparatus. Techniques that can be employed are described, for example, in U.S. Pat. No. 11,298,675, the entire contents of which are incorporated herein by this reference.

The porous solid adsorbents produced as described above can be further processed. In an optional step, for example, the porous solid amine adsorbents can be washed with water, alcohol or another suitable washing medium, e.g., to remove the solvent as completely as possible.

The porous solid adsorbent obtained by contacting the first and second solution, optionally washed, can be dried under ambient conditions or in an oven, e.g., at temperatures such as from 50° C. to 150° C.

In some cases, heat treatment (in a suitable oven, for instance) can be undertaken, e.g., to impart desired mechanical properties to the product adsorbent. Stepwise heating, followed by plateau temperature maintenance, optionally interspersed with one or more cooling and reheating periods, can be employed in some cases. Temperatures typically are above room temperature and are often at least 10° C. below the glass transition temperature of the water insoluble polymer. In an illustrative example, a PEI-based porous solid amine adsorbent in fiber form is heated to and maintained at 100° C. for a period of 24 hours, then cooled to room temperature over a period of 4 hours.

The porous solid amine adsorbents described herein can be characterized by analytical techniques such as nitrogen BET (Brunauer-Emmett-Teller), scanning electron microscopy (SEM), atomic force microscopy (AFM), Fourier transform infrared spectrometry (FTIR), or others, as currently known in the art or developed in the future. Standard methods or protocols (e.g., thermal gravity analysis, adsorption column) can be employed to assess the properties of the adsorbents.

The porous solid amine adsorbents described herein can have a density within a range of from about 0.2 g/cm$^3$ to about 1 g/cm$^3$, preferably from about 0.3 g/cm$^3$ to about 0.8 g/cm$^3$. They can have porosities that are open (interconnected). Total porosity amounts can be within a range of from about 20% to about 80%, preferably from about 30% to about 70% by volume. Pore size can vary and adsorbents described herein can include macroporosity, mesoporosity and/or microporosity. As used herein, macroporosity is defined by pores having a diameter larger than about 50 nanometers (nm); mesoporosity is defined by pores having a diameter within a range of from about 2 nm to about 50 nm; and microporosity is defined by pores having diameter less than about 2 nm. The type of porosity most relevant with respect to the removal of an acid gas such as carbon dioxide from a flue stream is macroporosity and/or mesoporosity.

Porosity attributes can be tailored by solvent concentration, nonsolvent, other additive and the concentration of the crosslinking agent or other approaches.

Many of the porous solid amine adsorbents prepared as described above are expected to withstand chemical degradation, when in contact with acid gases, and to remain stable at temperatures of at least 150° C. Good mechanical properties can preserve bead or fiber integrity and reduce or minimize attrition or other disintegration phenomena. Sheets, fibers, beads, etc. can be further characterized by mechanical properties such as tensile strength and nanoindentation.

Advantageously, methods described herein can produce porous solid amine adsorbents that are self-supporting (also referred to as "free-standing"), a property describing a material or an article that does not require an external supporting structure to prevent it from collapsing or crumbling.

The porous solid amine adsorbents according to embodiments described herein can be used to remove an acid gas from a fluid stream, e.g., a flue gas stream. Thus, in one aspect of the invention, a fluid stream containing an acid gas, $CO_2$, for instance, is brought into contact with the adsorbent (in the form of beads, fiber, hollow fiber, sheet, bulk adsorbent material or mass, monolith, etc.). As at least a portion of the acid gas (e.g., $CO_2$) becomes adsorbed by the porous solid amine adsorbent and the fluid stream is depleted in the acid gas (e.g., $CO_2$), generating a stream that is purified with respect to the acid gas.

For many applications, the adsorbent is packaged into a structured cartridge, a bed or another article. Cartridges that use porous solid amine adsorbents are described in U.S. Provisional Application 63/220,739, filed on Jul. 12, 2021 and incorporated herein by reference in its entirety. Arrangements that employ multiple cartridges are described in U.S. Provisional Application 63/220,744, filed on Jul. 12, 2021 and incorporated herein by this reference in its entirety.

Cartridges and/or modules that employ adsorbent materials described herein are described in U.S. Nonprovisional patent application Ser. No. 17/859,121, filed concurrently herewith and in International Patent Application No. PCT/US2022/036288, filed concurrently herewith, both of which are incorporated herein by this reference in their entirety.

Columns or beds (e.g., fixed, or moving) that are packed with the adsorbents described herein can be constructed and/or operated as known in the art.

Adsorbents containing a contaminant such as an acid gas (e.g., $CO_2$), for instance, can be regenerated for reuse or for environmentally safe disposal. Various methods can be employed, using heat, vacuum, lower pressure, or any combination thereof. If the regeneration technique relies on heat, the desorption process can be a temperature swing adsorption (TSA) method, while many processes based on lowered pressures are known as pressure swing adsorptions (PSA). Another useful technique that can be employed to release adsorbed species from the porous solid amine adsorbents described herein involves both heating and vacuum, the process being known as temperature-vacuum swing adsorption or TVSA.

These techniques are well known in the art (see, e.g., U.S. Pat. Nos. 9,457,340, and 8,974,577, the entire contents of both being incorporated herein by this reference) and can be used in conjunction with beads, fibers, sheets, bulk adsorbing materials or articles, etc.

One implementation relies on TSA or TVSA to regenerate fibers held in a cartridge and involve installing a heating element inside a vessel containing the cartridge. Several heating elements can be distributed among cartridges in arrangements that employ multiple cartridges. Example of heating elements that can be employed include but are not limited to heating tapes, heat exchanging pipes, heat exchanging plates and so forth. Installing one or more heating elements within the vessel can speed up the heating and cooling operations. In some embodiments, steam can be directed to the adsorbent directly to regenerate the adsorbent.

Temperatures, pressures and/or other parameters relevant to the adsorption or desorption stage can be monitored or controlled using techniques and devices known in the art. Adjustments can be made by an operator, for example. In automated processes, conditions and parameters can be computer controlled.

Porous solid amine adsorbents such as described herein also can find applications in the direct removal of an acid gas from an ambient atmosphere. Some approaches that can be employed to capture carbon dioxide from the atmosphere typically rely on a blower to circulate the air through the adsorbents. As carbon dioxide is adsorbed, clean air is released. Once the adsorbents are saturated with carbon dioxide, the air circulation is directed to another adsorbent device, and the current adsorbent is regenerated by heat, or vacuum, or a combination of both. The heat source can be from renewable energy sources, such as solar or wind energy.

The carbon dioxide released from the porous solid amine adsorbents described herein can be utilized for enhanced oil recovery, to prepare synthetic fuels, such as methanol, methane, jet fuels, etc. In some embodiments, the carbon dioxide is injected for storage.

The invention is further illustrated by the following nonlimiting examples.

COMPARATIVE EXAMPLE

This example was not performed in accordance with the present invention.

A dope solution was prepared by dissolving 10.0 g of polyacrylonitrile and 10.0 g of polyethylenimine (with MW of 25,000) in 45.0 g of NMP. After degassing, the dope solution was transferred into a fiber spinning apparatus equipped with a needle with an internal diameter (ID) of 0.4 mm. The dope solution was then delivered into deionized (DI) water. The fiber was further soaked in water for 24 h to remove NMP. The fiber was air dried.

A section of the fiber was tested with a TGA instrument for its $CO_2$ adsorption property. The fiber was first heated to 110° C. and held at 110° C. for 30 min to activate the fiber under nitrogen. This was followed by cooling the activated fiber to 25° C. under nitrogen. The fiber was then exposed to a $CO_2$ gas stream containing 4% water for 30 min. The weight gain of the fiber after the $CO_2$ exposure was only 0.94% by weight, indicating all but trace amount of PEI lost during fiber formation.

Example 1

This example was performed in accordance with embodiments of the present invention.

Figure 5:
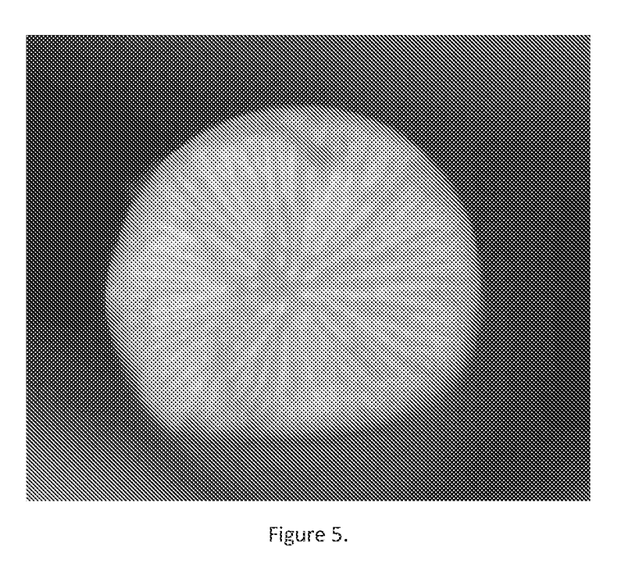
FIG. 5 is a photograph showing the cross section of a (non-hollow) sorbent fiber formed by contacting a dope solution containing PAN and PEI with a 5% MgSO4 water solution.

A dope solution was prepared by dissolving 10.0 g of polyacrylonitrile and 10.0 g of polyethylenimine (with MW of 25,000) in 45.0 g of NMP. After degassing, the dope solution was transferred into a fiber spinning apparatus equipped with a needle with an ID of 0.4 mm. The dope solution was then delivered into a DI water solution containing 5% by weight of MgSO4. The fiber was further soaked in water for 24 h to remove NMP. The fiber was then air dried. A photograph of a cross section of the fiber is presented in FIG. 5.

Figure 7:
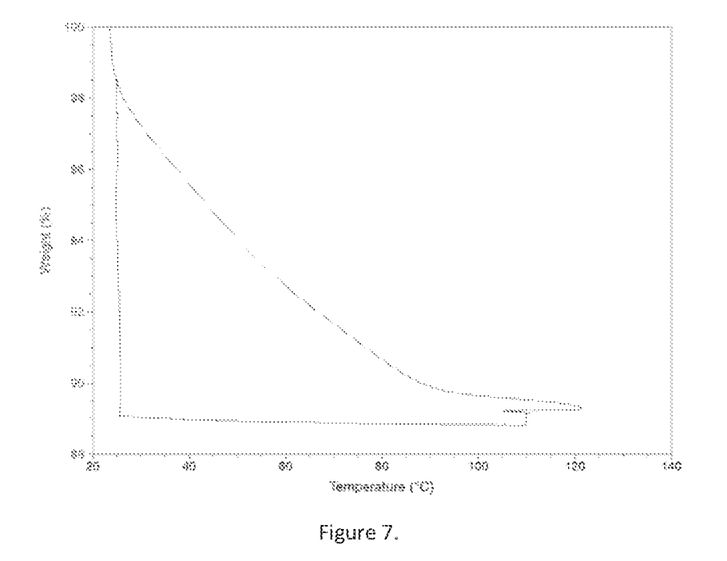
FIG. 7 is a TGA graph showing the activation of a sorbent fiber at 110 degrees centigrade (° C.) and the adsorption of $CO_2$ at 25° C. The sorbent fiber is prepared from a dope solution containing PAN and PEI by contacting with a 5% MgSO4 solution.

A section of the fiber was tested with a TGA instrument for its $CO_2$ adsorption property. The fiber was first heated to 110° C. and held at 110° C. for 30 min to activate the fiber under nitrogen. This was followed by cooling the activated fiber to 25° C. under nitrogen. The fiber was then exposed to a $CO_2$ gas stream containing 4% water for 30 min. The weight gain of the fiber after the $CO_2$ exposure was 10.6% by weight. A TGA graph (FIG. 7) shows the activation of the sorbent fiber at 110° C. and the adsorption of $CO_2$ at 25° C.

Example 2

This example was performed in accordance with embodiments of the current invention.

Figure 6:
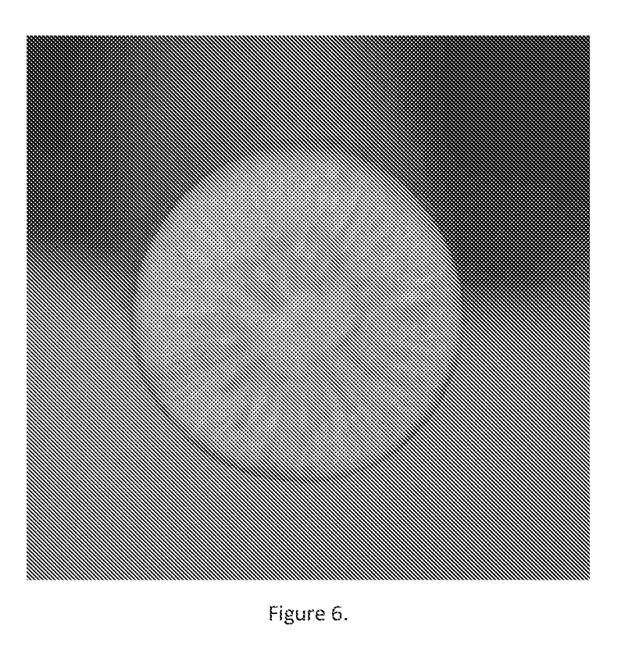
FIG. 6 is a photograph showing the cross section of a (non-hollow) sorbent fiber formed by contacting a dope solution containing PAN and PEI with a 0.2% oxalic acid water solution.

A dope solution was prepared by dissolving 10.0 g of polyacrylonitrile and 10.0 g of polyethylenimine (with MW of 25,000) in 45.0 g of NMP. After degassing, the dope solution was transferred into a fiber spinning apparatus equipped with a needle with an ID of 0.4 mm. The dope solution was then delivered into a DI water solution containing 0.2% by weight of oxalic acid. The fiber was further soaked in water for 24 h to remove NMP. The fiber was then air dried. A photograph of a cross section of the fiber is presented in FIG. 6.

Figure 8:
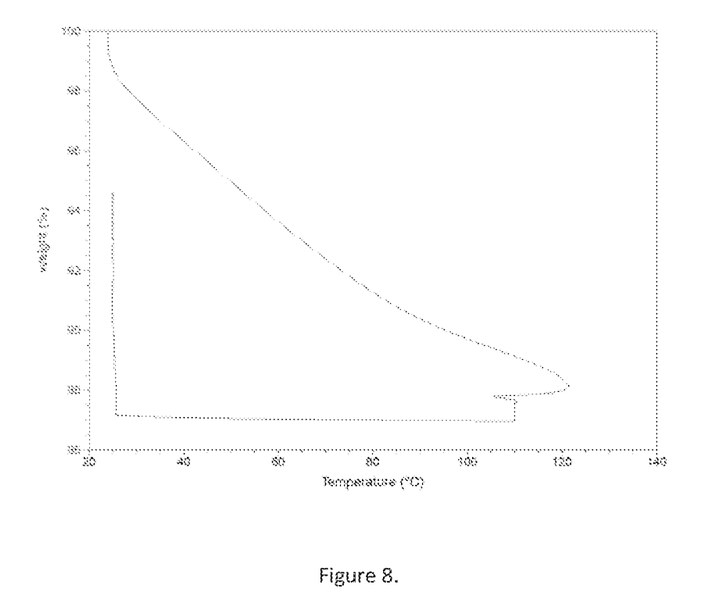
FIG. 8 is a TGA graph showing the activation of a sorbent fiber at 110° C. and the adsorption of $CO_2$ at 25° C. The sorbent fiber is prepared from a dope solution containing PAN and PEI by contacting with a 0.2% oxalic acid solution.

A section of the fiber was tested with a TGA instrument for its $CO_2$ adsorption property. The fiber was first heated to 110° C. and held at that temperature for 30 min to activate the fiber under nitrogen. This was followed by cooling the activated fiber to 25° C. under nitrogen. The fiber was then exposed to a $CO_2$ gas stream containing 4% water for 30 min. The weight gain of the fiber after the $CO_2$ exposure was 8.6% by weight. A TGA graph showing the activation of the sorbent fiber at 110° C. and the adsorption of $CO_2$ at 25° C. is shown in FIG. 8.

While this invention has been particularly shown and described with references to preferred embodiments thereof, it will be understood by those skilled in the art that various changes in form and details may be made therein without departing from the scope of the invention encompassed by the appended claims.

What is claimed is:

1. A process for removing an acid gas from a fluid stream containing the acid gas, the process comprising:
contacting the fluid stream with a porous solid amine adsorbent, whereby at least a portion of the acid gas is adsorbed by the porous solid amine adsorbent to produce a purified fluid stream,
wherein,
the porous solid amine adsorbent is prepared by a method comprising:
bringing into contact a first solution, the first solution containing a water insoluble polymer and a water-soluble amine polymer, with an aqueous solution containing a multifunctional chemical agent, to form a solid material;
drying the solid material to produce the porous solid amine adsorbent; and
optionally heating the porous solid amine adsorbent to produce a heat-treated porous solid amine adsorbent.

2. The process of claim 1, wherein the first solution is formed by combining the water insoluble polymer and the water-soluble amine polymer in a polar solvent.

3. The process of claim 2 wherein the polar solvent is selected from the group consisting of: DMF, DMAc, DMSO, THF, ethanol, propanol, and any mixture thereof.

4. The process of claim 1, wherein the water-soluble amine polymer is a polyethylenimine or wherein the water-soluble amine polymer is a polyvinylamine.

5. The process of claim 4,
wherein the water-soluble amine polymer is a polyethylenimine having a molecular weight in the range of about 400 to about 10,000,000 or a polyvinylamine having a molecular weight in the range of 400 to 10,000,000, or
wherein the water-soluble amine polymer is a linear or a branched polyethylenimine, or
wherein the water-soluble amine polymer is a partially crosslinked polyethylenimine or a partially crosslinked polyvinylamine.

6. The process of claim 1 wherein the water insoluble polymer is selected from the group consisting of polysulfone, cellulose, polyacrylonitrile, polyvinyl difluoride, polyvinylchloride, and any mixture thereof.

7. The process of claim 1, wherein the multifunctional chemical agent is selected from the metal cation group consisting of $Cu^+$, $Cu^{2+}$, $Zn^{2+}$, $Ca^{2+}$, $Mg^{2+}$, $Fe^{2+}$ and any mixture thereof.

8. The process of claim 1, wherein the multifunctional chemical agent is an organic acid selected from the group consisting of oxalic acid, citric acid, phytic acid, malic acid, humic acid polyacrylic acid and any mixture thereof.

9. The process of claim 1, wherein the aqueous solution further includes a multifunctional aldehyde or a multifunctional epoxide.

10. The process of claim 1 wherein the porous solid amine adsorbent is in the form of a particulate material, sheet, fiber or hollow fiber.

11. The process of claim 1, wherein the acid gas is $CO_2$, $SO_2$ or $H_2S$.

12. The method of claim 1, further comprising washing the solid material before drying.

13. A method for preparing a porous solid amine adsorbent, the method comprising:
bringing into contact a first solution that includes a water insoluble polymer and a water-soluble amine polymer with an aqueous solution containing a multifunctional chemical agent to produce a solid material;
drying the solid material, to produce the porous solid amine adsorbent; and
optionally heating the porous solid amine adsorbent to produce a heat treated porous solid amine adsorbent.

14. The method of claim 13, wherein the first solution is formed by combining the water insoluble polymer and the water-soluble amine polymer in a polar solvent.

15. The method of claim 14, wherein the polar solvent is selected from the group consisting of: DMF, DMAc, DMSO, THF, ethanol, propanol, and any mixture thereof.

16. The method of claim 13, wherein the water-soluble amine polymer is a polyethylenimine or a polyvinylamine.

17. The method of claim 16,
wherein the water-soluble amine polymer is a polyethylenimine having a molecular weight in the range of about 400 to about 10,000,000 or a polyvinylamine having a molecular weight in the range of 400 to 10,000,000, or
wherein the water-soluble amine polymer is a linear or a branched polyethylenimine, or
wherein the water-soluble amine polymer is a partially crosslinked polyethylenimine or a partially crosslinked polyvinylamine.

18. The method of claim 13, wherein the water insoluble polymer is selected from polysulfone, cellulose, polyacrylonitrile, polyvinyl difluoride, polyvinylchloride, or a mixture thereof.

19. The method of claim 13, wherein the multifunctional chemical agent is selected from the metal cation group consisting of $Cu^+$, $Cu^{2+}$, $Zn^{2+}$, $Ca^{2+}$, $Mg^{2+}$, $Fe^{2+}$ and any mixture thereof.

20. The method of claim 13, wherein the multifunctional chemical agent is an organic acid selected from the group consisting of oxalic acid, citric acid, phytic acid, malic acid, humic acid polyacrylic acid and any mixture thereof.

21. The method of claim 13, wherein the aqueous solution further includes a multifunctional aldehyde or a multifunctional epoxide.

22. The method of claim 13, wherein the porous solid amine adsorbent is in the form of a particulate material, sheet, fiber or hollow fiber.

23. The method of claim 13, wherein the porous solid amine adsorbent is self supporting.

24. A porous solid amine adsorbent prepared by the method of claim 13.

25. The method of claim 13, further comprising washing the solid material before drying.

26. The method of claim 13, wherein the multifunctional chemical agent is a multifunctional metal ion, a multifunctional inorganic acid, or a multifunctional organic acid.

* * * * *